United States Patent [19]

Vignerot et al.

[11] Patent Number: 4,504,841
[45] Date of Patent: Mar. 12, 1985

[54] MARKING DEVICE

[75] Inventors: Eugene Vignerot, Westminster; W. S. Law, Englewood, both of Colo.

[73] Assignee: L. V. J. Corporation, Englewood, Colo.

[21] Appl. No.: 415,897

[22] Filed: Sep. 8, 1982

[51] Int. Cl.³ .......................... G01D 15/28; B41J 11/64
[52] U.S. Cl. ...................................... 346/104; 116/306; 400/127
[58] Field of Search .................... 346/51, 66, 104, 143, 346/146; 116/306, 325, 326, 235, 236, 240; 400/127

[56] References Cited

U.S. PATENT DOCUMENTS

| | | | |
|---|---|---|---|
| 543,603 | 7/1895 | Palmer | 346/104 |
| 1,938,488 | 11/1928 | Howell | 235/50 |
| 2,392,488 | 1/1946 | MacCallum | 164/111 |
| 2,968,276 | 1/1961 | Betterton | 116/130 |
| 3,129,660 | 4/1964 | Miller | 101/103 X |
| 3,733,466 | 5/1973 | Krumrey | 235/61.6 E |
| 3,910,473 | 10/1975 | Colon | 225/93 X |
| 4,137,863 | 2/1979 | Anglin | 116/306 |

Primary Examiner—E. A. Goldberg
Assistant Examiner—Gerald E. Preston
Attorney, Agent, or Firm—Sheridan, Ross & McIntosh

[57] ABSTRACT

A marking device is configured to retain a preprinted card normally printed with inventory or reminder list items. The body of the device has a support and a face piece with correspondingly mating embossing elements for so marking the related item on the list. The embossing elements are a number of manually movable keys that leave an impression on the card when depressed into engagement with the protrusions aligned with the support piece below. The body may be made of plastic with the face piece of clear plastic for item visibility. The keys may also contain a manification property.

6 Claims, 5 Drawing Figures

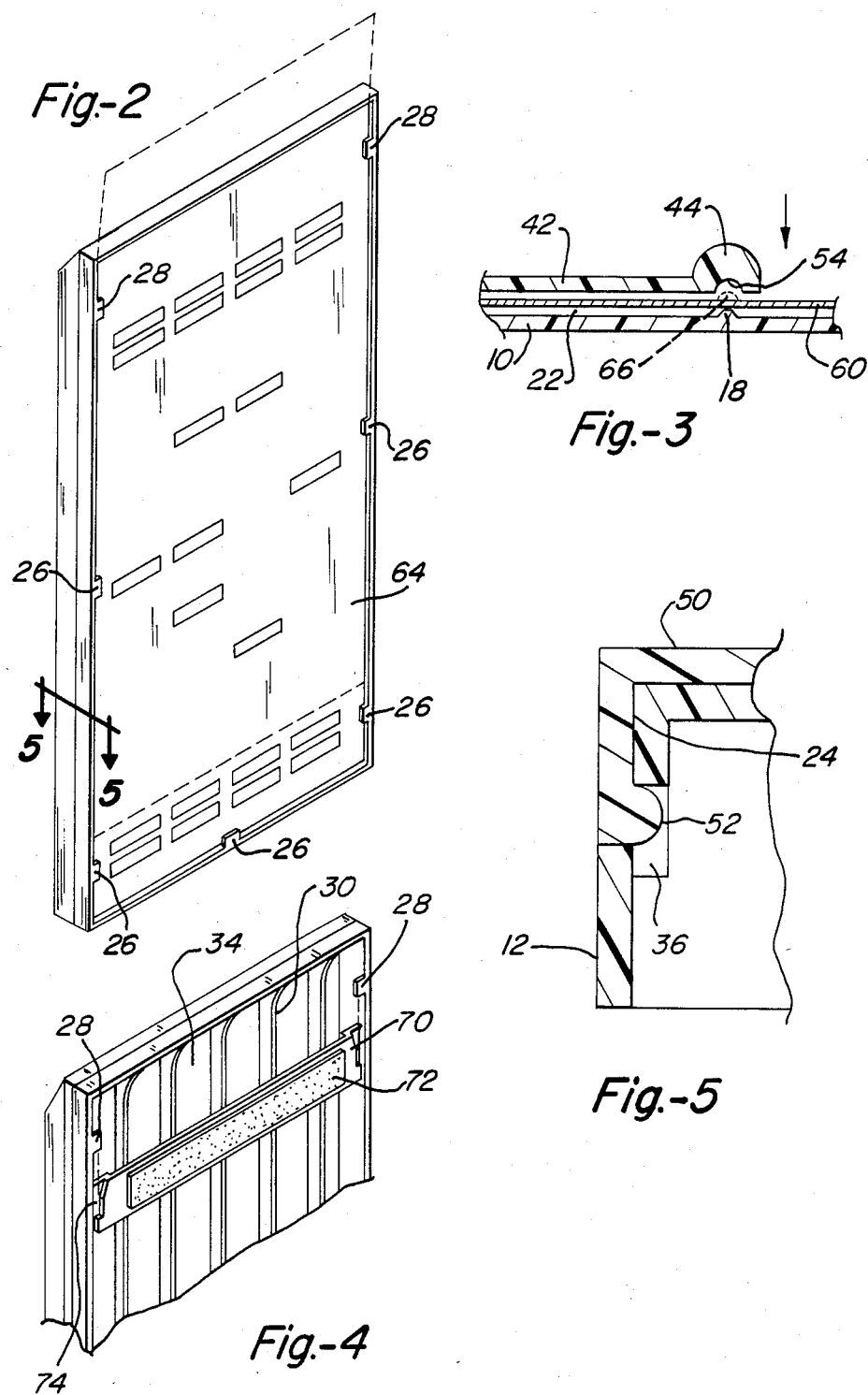

MARKING DEVICE

TECHNICAL FIELD

This invention lies in the field of marking and listing devices.

BACKGROUND OF THE INVENTION

Marking means, particularly to keep track of items needed to conduct ordinary life, are probably older than writing itself. With the advent of printing, it became possible to prepare preprinted inventory lists on which a user could check off appropriate items for procurement, using a pen or other hand-held marking means. The typewriter, and adding machines, are examples of marking devices which operate by means of depressed keys. Previous key-operated marking devices, however, have been cumbersome, and inconvenient for use by homemakers in preparing grocery lists. The average homemaker still relies on the paper and pencil method for preparing a grocery list. Drawbacks to this method include the difficulty of keeping the pencil and paper together where they can be readily found, and the fact that the resultant list is usually disorganized, and items are often forgotten. In addition, the paper and pencil method is not available to people who are unable to write, because of extreme youth, illiteracy, or injury or disease. Additional problems may arise when the person doing the shopping cannot read, does not speak the same language as the person who wrote the list, or is unable to read the handwriting on the list.

The device of the present invention, which provides a means for marking items on a preprinted list by depressing a button, is particularly suited to inventory control, and especially to domestic grocery lists. The device is designed to be mounted on a wall or other surface, where it is readily available at all times when needed, obviating the problem of lost pencils. Extra preprinted lists are stored in the back compartment of the lister. The preprinted list may include pictures, or listed items in several languages for use by children, illiterates, and users and shoppers having different languages. To designate an item, the user simply presses a button. The device is thus operated by people who are unable to write, and provides a list which is easy for the shopper to read. The fact that the preprinted list contains all the items normally needed provides the user with a method for double-checking his list so that no items are forgotten. In addition, the list may be arranged alphabetically, or in other convenient order, such as in order of the items as they are stocked on the shelves of the store, to facilitate finding of each item.

The device is simply constructed of readily-available materials, so as to be priced within the range of all consumers, and is fast, efficient and enjoyable to use.

PRIOR ART STATEMENT

U.S. Pat. No. 2,392,488 to MacCallum describes a listing machine for preparing a grocery list which creates the list by means of two movable, hand-operated punching devices on each side of the lister, which perforate selected items on preprinted paper rolls. This lister requires that the perforating device be moved each time a new item is designated, in contrast to the present invention which provides a separate marking key for each item.

U.S. Pat. No. 3,733,466 to Krumrey describes a perforating device useful for grading examination papers. This device provides for multiple perforations by means of a multitude of punches, all or some of which are actuated upon manipulation of a hand-actuated lever system. The device of this invention does not include the plurality of keys of the present invention, nor is it adapted to use in inventory control.

U.S. Pat. No. 1,938,488 to Howell describes a device for recording votes which allows the voter to preset a number of keys to designate persons running for office or propositions being voted upon, which operate to perforate a ballot on a roll of paper. Only a predetermined number of keys may be operated. The device is extremely complex, requiring a large number of mechanical parts, and does not provide the ease of a construction and operation of the present invention in which the depression of single keys directly marks single items.

U.S. Pat. No. 3,129,660 to Miller is a portable imprinting device providing a means for imprinting particular letters, numbers, or other symbols by means of depressed keys. This device is not designed for marking preprinted lists, as is the present invention.

SUMMARY OF THE INVENTION

The device of the present invention is comprised of a card support member having upon its surface a plurality of embossing punches or dies. A preprinted card, preferably a preprinted grocery list, is placed over the card support member so that each item on the list corresponds with one embossing die or punch. A face piece fits over the top of both the list and the card support member, and this face piece is preferably transparent for viewing the list beneath. The face piece bears a plurality of keys, preferably transparent, each key bearing an embossing punch or die designed to cooperate with its opposite on the card support member to emboss or perforate a listed item on the list when any key is depressed. The preprinted lists may be inserted and removed from the device through a slot in the top. The device is also equipped with mounting means and space in the back thereof for storing reserve preprinted cards.

BRIEF DESCRIPTION OF THE DRAWINGS

FIG. 2 is a perspective view of the underside of the invention showing one card being removed from a stack of stored preprinted cards.

FIG. 3 is a fragmentary, enlarged view of the operation of a single key of the invention in transverse section.

FIG. 4 is a perspective view of the underside of the invention showing the mounting bracket used in conjunction therewith.

FIG. 5 is a cross-sectional view along line 5—5 of FIG. 2 showing the snap fit assembly mechanism between the upper and lower components of the device.

DESCRIPTION OF THE PREFERRED EMBODIMENTS

Figure 1:
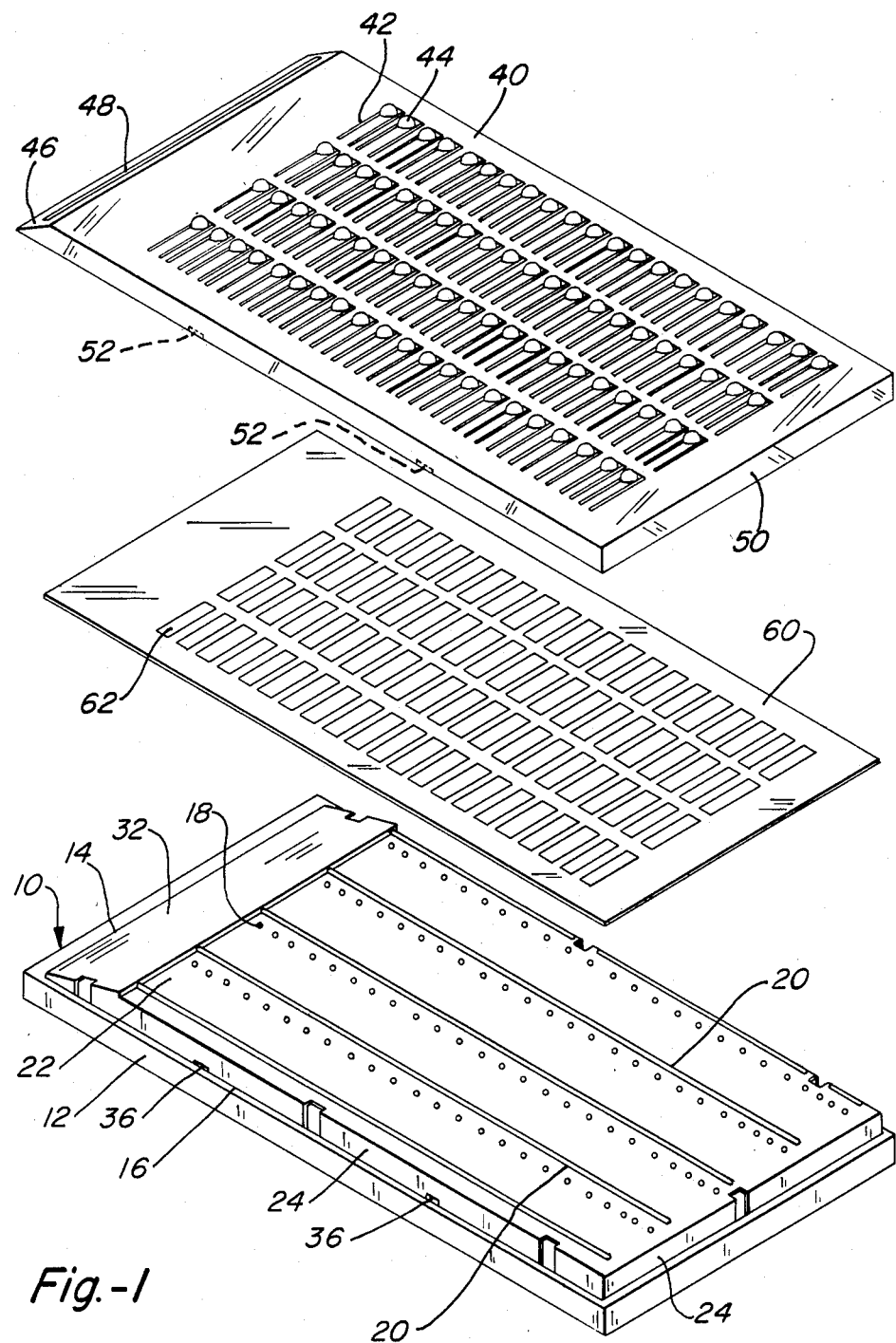
FIG. 1 is an exploded view of the three components of the invention as viewed from above.

As shown in FIG. 1, the preferred embodiment of the grocery lister or device of this invention is comprised of a main body, over which a preprinted card bearing listed items may be placed, and a face piece bearing operating keys for marking the preprinted card, which is designed to fit over the top of the card and main body.

The device may be made of any suitable material, preferably plastic.

The main body 10 is comprised of a base piece 12, preferably shaped like a rectangular box open at the underside to accommodate extra or reserve preprinted cards 64 for storage, as shown in FIG. 2. Atop the base piece 12, also preferably basically rectangular in shape, and open on the underside, but of somewhat smaller outer dimensions, is card support member 14. The card support member may be glued to the base piece 12 or otherwise attached; or preferably the base piece 12 and card support member 14 are molded or cast together as one piece. The horizontal rim 16 on base piece 12 extending past the edges of card support member 14, as a result of the smaller dimensions of card support member 14, is a mounting rim upon which face piece 40 rests.

Card support member 14 comprises an upper horizontal surface, three vertical walls 24 on the sides and bottom end, and an angled wall serving as a card guide 32 at the top end. The upper surface of card support member 14 is divided into rows by a plurality of ridges or card-spacing guides 20. Each of these rows contains a row of marking means, preferably the depicted embossing punches 18. The card spacing guides 20 are high enough to keep a preprinted card 60 from resting on the embossing punches 18 and prevent the edge of the preprinted card 60 from catching on the punches 18 when it is being inserted into the device. The card spacing guides 20 also facilitate the removal of the preprinted card 60 since the preprinted card 60 is slid along the card spacing guides 20 during removal and does not appreciably engage the embossing punches 18. The card spacing guides 20 together with the upper surface of card support member 14 define a key deflecting space 22 allowing room for the movable keys 42 of face piece 40 to be depressed as hereinafter described.

The preprinted card 60, which may be composed of a thin paper capable of being punched or embossed, or of any material capable of being marked (altered) by the device as hereinafter described, contains a plurality of rows of listed items 62 spaced so as to provide one listed item over each embossing punch 18 when the card is in place as hereinafter described. Any number of rows of listed items, and correspondingly any number of card spacing guides 20 and any number of movable keys 42 may be utilized.

Face piece 40 consists of a rectangular, box-shaped member, open at the underside and having three vertical walls 50 on the sides and bottom end and one angled wall serving as a card insertion surface 46 at the top end. Preferably the slope of card insertion surface 46 is steeper than that of card guide 32 which lies directly thereunder, to allow space for the insertion of preprinted cards 60.

Face piece 40 is designed to fit over card support member 14 and rest upon horizontal rim 16. Preferably, as shown in detail in FIG. 5, the face piece 40 snaps onto the main body 10 or card support member 14 by means of male assembly plugs 52 on the side walls 50 of face piece 40 which snap into female assembly receptacles 36 on the side walls 24 of card support member 14. Alternatively, the face piece 40 may fit over and remain attached to the card support member 14 by friction between the end and side walls 24 of the card support member 14 and the inner surfaces of the face piece walls 50. Alternatively, the card support member 14 and face piece 40 may be glued together or otherwise permanently attached to each other.

The card insertion surface 46 has an opening or card insertion slot 48 substantially along its length of sufficient size to allow a preprinted card 60 to be inserted into the device between base piece 12 and face piece 40. The preprinted cards 60 may contain pictures of listed items, or listed items in more than one language to facilitate use by those who are not literate in English. Each preprinted card 60 is sized so that when dropped into place with the bottom edge thereof resting against the bottom vertical wall 50 of face piece 40, each preprinted item thereon is aligned with one embossing punch 18 on card support member 14, and one female embossing die or marking means 54 on a movable key 42 on face piece 40. The preprinted cards 60 are preferably of sufficient length to protrude slightly out of card insertion slot 46 so as to facilitate removal.

Face piece 40 contains a plurality of rows of movable keys 42 on its horizontal upper surface, placed so that each movable key 42 is aligned with each listed item 62. Any number of listed items 62 may be printed on the preprinted cards, and correspondingly, any number of movable keys 42 may be utilized. Each key 42 is individually operable by the user and bears an operating button 44 placed so that when the face piece 40 is in proper place over the main body 10, each operating button 44 is aligned with each embossing punch 18. The operating buttons 44 are preferably dome-shaped, but may be of any shape or size so as to provide a surface for the operator's finger to press. In a preferred embodiment, the operating button 44 is also a magnifying lens allowing the operator to view the mark made by operating the device on the listed item 62 beneath. On the underside of the operating button 44 is a marking means, such as a female embossing die 54, as shown in FIG. 3.

The face piece 40 is preferably transparent and the movable keys 42 are preferably formed by making three-sided cuts in the surface of the face piece 40 to form rectangular keys, leaving the fourth side of the rectangle uncut, and attached to the main surface of the face piece 40. Preferably the material from which the face piece 40 is made is a flexible plastic which allows the movable keys 42 to deflect downward onto the embossing punches 18 when depressed, and when released to automatically spring back into position flush with the upper surface of the face piece 40. The keys 42 may also be hinged or otherwise rotatably attached to the surface of the face piece 40 and equipped with resilient means, such as springs, allowing them to return to a resting position flush with the surface of the base piece 12 after operation.

Preferably the printing on the preprinted cards 60 may be viewed through the transparent material of the keys. Alternatively, listed items may be printed directly on the keys 42, corresponding with the listed items printed on the preprinted cards 60.

FIG. 2 shows an embodiment of this invention in which base piece 12 is hollow. The depicted underside of base piece 12 provides storage space for reserve preprinted cards 64. These cards are retained in place by a plurality of card-retaining tabs 26 and also by mounting engagement tabs 28.

As well as being formed with female embossing dies 54 on their undersides as depicted in FIG. 3, movable keys 42 may be equipped with embossing punches, and the base piece 12 correspondingly formed with female embossing dies. The preprinted card 60 may be marked by means of these cooperating dies and punches with an embossed bulge or indentation, or puncture; or if a carbon ribbon or other marking means is inserted between the die and punch and the card, the card may be marked or inked by means thereof; or the card may be composed of or coated with a material which darkens with pressure so as to form a permanent mark; or the embossing punch may be equipped with sharp edges so as to punch out a hole in the preprinted card.

FIG. 4 shows the underside of base piece 12 without stored reserve preprinted cards 64. A curved top surface, preferably equipped with curved ribs as depicted, serves as reserve card insertion guides 30 to guide the reserve preprinted cards 64 into place as they are inserted for storage.

The device may be mounted on a wall or other surface by means of a mounting plate 70 equipped with an adhesive or sticky surface causing it to adhere to a wall or other surface without mechanical means. Other fastening devices may be employed such as screws. Alternatively, the device may be set on a table and operated in the horizontal position. In general, the device may be mounted on any horizontal or vertical surface by means known to the art.

In the depicted embodiment of FIG. 4, mounting engagement tabs 28 project over the open underside of base piece 12 near the top end and are shaped so as to slide into recess 74 in mounting plate 70, which adheres to the wall by means of sticky surface 72. Recess 74 is triangular in shape so as to allow the mounting engagement tabs 28 to slide onto the wide end thereof and rest on the narrow end. When the mounting plate 70 is attached to a wall or other vertical surface, and the mounting engagement tabs 28 are slid into place, the tabs 28 are enclosed on all sides by the walls formed by recess 74 and the room wall or other surface, and the top is left open.

When the device is in use, e.g., by a homemaker in charge of keeping the kitchen supplied with groceries, the user inserts a preprinted card 60 into slot 48, aided by the angle of card insertion surface 46 which guides the edge of the card to the slot 48. The correctly-placed card 60 lies in the space between base piece 12 and face piece 40, and rests upon, or is held away from the embossing punches 18, by card spacing guides 20. The card is preprinted with listed items 62, such as bread, flour, fruit, eggs, vegetables, etc. The homemaker notes the necessity of purchasing a particular listed item by depressing operating button 44, best shown in FIG. 3, above that item. This causes movable key 42 to deflect downward into key deflecting space 22 until female embossing die 54 on the underside of operating button 44 fits closely over embossing punch 18, squeezing the preprinted card 60 between embossing punch 18 and female embossing die 44 so as to make a permanent embossed bulge 66 or puncture in the appropriate listed item space 62. The movable key 42 then returns to its original, substantially horizontal position while the card spacing guides 20 aid in returning the preprinted card 60 to its original position and away from the top surface of the card support member 14. In this manner, the card spacing guides 20 minimize adherence of the preprinted card 60 to the top surface of the card support member 14 so that, when removal of the preprinted card 60 is desired, it can be easily accomplished.

Typically, by the time the homemaker is ready to buy the groceries, a number of listed items will have been so indicated on the card 60. The homemaker then removes the preprinted card 60 from slot 46 and uses it as a grocery list, replacing the embossed card 60 just removed with another card 64 from the storage space on the underside of the base piece 12. When all the reserve preprinted cards 64 have been removed from the storage space, additional cards 64 may be inserted into the storage space from the top end. Reserve card insertion guides 30 guide the reserve card 64 supply into place. The device may be removed from the wall or other surface if necessary by sliding it up and out of the recesses 74 in mounting plate 70.

From the foregoing, the advantages of this invention are readily apparent. A marking device has been provided by means of which a preprinted card can be marked by simply depressing a key. The marking device of the present invention has significant utility in the broad area of inventory control, including the making of shopping lists by a consumer. In addition, various other applications of the device disclosed herein can be made where it is desirable to provide a mark to denote information.

We claim:

1. A marking device, comprising:
    a body having a first surface;
    a plurality of embossing punches formed on said first surface, each of said embossing punches extending outwardly away from said first surface, said plurality of embossing punches being positioned on said first surface to define a plurality of rows and columns of embossing punches;
    a preprinted card supported on said first surface, said card having a number of listed items, each of said listed items having a marking space adjacent thereto;
    a face piece having an outer surface and being connected to said body and overlying substantially all of said first surface of said body and overlying substantially all of said card, said card being located between said first surface of said body and said face piece;
    said face piece including opening means, said opening means being continuously opened to receive said card for positioning between said first surface of said body and said face piece;
    said face piece including a plurality of movable, resilient keys, each of said keys being formed integral with said outer surface of said face piece to be continuously, fixedly attached thereto, each of said keys including an operating button, each of said operating buttons being aligned with a separate one of said embossing punches, each of said operating buttons extending outwardly away from said outer surface of said face piece and said first surface of said body, each of said operating buttons being of a size to matingly engage a separate one of said embossing punches when said each operating button is moved sufficiently toward said separate one embossing punch with one of said marking spaces therebetween;
    said card and said first surface of said body supporting said card being devoid of movement together in order to provide a mark at a desired location on said card;
    said face piece and each of said movable, resilient keys including said operating button thereof being free of predetermined indicia for providing information regarding each of said keys including said operating button thereof.

2. A marking device, as claimed in claim 1, wherein:

said opening means includes a slot formed between two portions of said face piece to receive said card and position said card between said first surface of said body and said face piece;

3. An apparatus, as claimed in claim 1, wherein: said body includes walls and said face piece includes walls extending beyond said outer surface of said face piece, said walls of said body and said walls of said face piece overlapping, and means being provided to connect said face piece to said body along said walls of said body and said face piece.

4. A marking device, as claimed in claim 1, wherein: said first surface of said body includes at least one ridge formed thereon, said ridge extending outwardly away from said first surface of said body, said ridge being of a greater height than each of said embossing punches.

5. A marking device, as claimed in claim 1, wherein: said body includes a second surface and a card holding means, a number of preprinted cards being located between said card holding means and said second surface of said body, said number of card means being separated from said card located between said first surface of said body and said face piece.

6. A marking device, as claimed in claim 1, wherein: each of said operating buttons includes means for providing magnification to determine whether a mark was made on said card using one of said embossing punches and one of said operating buttons.

* * * * *